United States Patent
Chen

(10) Patent No.: US 8,077,926 B2
(45) Date of Patent: Dec. 13, 2011

(54) METHOD OF MOTION DETECTION USING ADAPTIVE THRESHOLD

(75) Inventor: Ying-Ru Chen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 582 days.

(21) Appl. No.: 12/353,679

(22) Filed: Jan. 14, 2009

(65) Prior Publication Data
US 2010/0177935 A1    Jul. 15, 2010

(51) Int. Cl.
*G06K 9/00* (2006.01)
*H04N 11/02* (2006.01)

(52) U.S. Cl. ............. 382/107; 382/172; 375/240.16

(58) Field of Classification Search ........ 382/100, 382/103, 104, 106, 107, 117, 162, 168, 172, 382/173, 181, 190–195, 209, 219–224, 232, 382/254, 260, 274–275, 276, 291, 305, 312; 375/240.12, 240.16; 73/715; 706/18, 20
See application file for complete search history.

(56) References Cited

U.S. PATENT DOCUMENTS

| | | | |
|---|---|---|---|
| 6,037,986 A * | 3/2000 | Zhang et al. | 375/240.12 |
| 6,965,645 B2 * | 11/2005 | Zhang et al. | 375/240.16 |
| 7,100,454 B2 * | 9/2006 | Hasunuma | 73/715 |
| 7,162,056 B2 * | 1/2007 | Burl et al. | 382/104 |
| 7,729,510 B2 * | 6/2010 | Zakrzewski et al. | 382/100 |
| 7,953,251 B1 * | 5/2011 | Steinberg et al. | 382/117 |
| 7,991,714 B2 * | 8/2011 | Widrow et al. | 706/18 |

* cited by examiner

*Primary Examiner* — Seyed Azarian
(74) *Attorney, Agent, or Firm* — J.C. Patents

(57) ABSTRACT

A method of motion detection using an adaptive threshold, adaptive for determining whether a plurality of target pixels in a current scan line are moving pixels or not, is provided. First, a first threshold is given for determining whether the target pixels in the current scan line are moving pixels. Then, a number of moving pixels in a previous scan line of the current scan line is calculated and determined whether larger than a second threshold. If the number of moving pixels is larger than the second threshold, the first threshold is adjusted by a decrement, and then whether the target pixels in the current scan line are moving pixels is determined by using the adjusted first threshold.

6 Claims, 2 Drawing Sheets

METHOD OF MOTION DETECTION USING ADAPTIVE THRESHOLD

BACKGROUND OF THE INVENTION

1. Field of the Invention

The present invention generally relates to a method of motion detection, and more particularly, to a method of motion detection using an adaptive threshold.

2. Description of Related Art

With development of multimedia technique, requirement for image quality is substantially increased. The image quality may be influenced by the noises generated during image capturing, signal conversion and signal transmission. Therefore, an image processing technique is required to eliminate the noises that may be sensed by human eyes. The image processing methods for noise reduction commonly include a spatial noise-reduction process and a temporal noise-reduction process.

The spatial noise-reduction process applies a filter to perform spatial filtering process on the pixels of a current field, so as to smooth and soften the field, and reduce a visual perception of the human eyes for the noises. However, such method generally leads to image blurs, which may influence the presentation of image details, such as edges and textures, for example.

The temporal noise-reduction process references information of a previous field, so as to perform temporal filtering process to the pixels of the current field. Since the current field is highly related to the previous field, the temporal noise-reduction process can maintain and reserve details of the field. However, when the temporal filtering process is performed on a moving object within the field, motion blurs may occur on the edges of the moving object. Therefore, a motion detection algorithm is provided to detect the moving pixels in the field, so as to adjust an intensity of the temporal filtering for eliminating the motion blurs.

Generally speaking, motion detection uses differnces between correpsonding pixels in the same parity field to determine whether the designated pixels are moving pixels or not. If the difference is larger than a preset threshold, it means a variation is occurred in the content of the video and the corresponding pixels are determined as the moving pixels. On the other hand, if the difference is smaller than the preset threshold, it means no variation is occurred in the content of the video and the corresponding pixels are determined as the static pixels.

Through the motion detection as described above, motion information of pixels of the moving object is obtained and referenced for determining whether to use a spatial interpolation or a temporal interpolation method to generate the required field data, in which the temperal interpolation is used for calculating values of pixels in an area with no moving object and the spacial interpolation is used for calculating values of pixels in an area with the moving object.

As described in the above, the motion detection algorithm is complicated and requires a large amount of calculation. The value of the threshold used for determining a moving area and a static area is hard to formulate, in which the moving area can be mistakenly determined as the static area by using excessively large threshold while the static area can be mistakenly determined as the moving area by using excessively small threshold. Therefore, there is a need to well define a threshold as a reference for judging the moving area and the static area, so as to increase the accuracy of motion detection.

SUMMARY OF THE INVENTION

In light of the above, the present invention provides a method of motion detection using an adaptive threshold, in which the threshold are automatically adjusted based on the content of video so as to increase the accuracy of motion detection.

In order to achieve the above-mentioned or other objects, the present invention provides a method of motion detection using an adaptive threshold, adaptive for determining whether a plurality of target pixel in a current scan line are moving pixels or not. First, a first threshold is given for determining whether the target pixels in the current scan line arethe moving pixels. Then, a number of moving pixels in a previous scan line of the current scan line is calculated and determined whether larger than a second threshold. If the number of moving pixels is larger than the second threshold, the first threshold is adjusted by a decrement, and then whether the target pixels in the current scan line are the moving pixels is determined by using the adjusted first threshold.

According to an embodiment of the present invention, after the step of giving the first threshold, the method further adjusts the first threshold by an increment when the motion detection of every L scan lines is completed, wherein L is a positive integer.

According to an embodiment of the present invention, the first threshold has an upper limit and a lower limit, in which the first threshold is set as the upper limit when the adjusted first threshold is larger than the upper limit and set as the lower limit when the adjusted first threshold is smaller than the lower limit.

According to an embodiment of the present invention, after the step of determining whether the target pixels in the current scan line are the moving pixels by using the adjusted first threshold, the method further records a result of motion detection of the target pixels in the current scan line as a reference for calculating the number of moving pixels when performing motion detection on a next scan line.

According to an embodiment of the present invention, in the step of determining whether the target pixels in the current scan line are the moving pixels by using the adjusted first threshold, a sum of a plurality of differences between the corresonding neighboring pixels of each of the target pixels in adjacent fields is calculated and compared with the adjusted first threshold to determine whether the target pixel is the moving pixel.

According to an embodiment of the present invention, in the step of comparing the sum with the adjusted first threshold to determine whether the target pixel is the moving pixel, the target pixel is determined as the moving pixel if the sum is larger than the first threshold, and the target pixel is determined as a static pixel if the sum is not larger than the second threshold.

In the present invention, when performing motion detection on target pixels in a current scan line, the pixels in a previous scan line of the current scan line are determined whether within the moving area. If those pixels are determined as within the moving area, then the threshold is adaptively reduced so as to well detect the motion of the pixels in the current scan line. On the contrary, if the those pixels are determined as not within the moving area, then the threshold is adaptively increased so as to restore the reduced threshold. Accordingly, the accuracy of motion detection can be increased.

In order to make the aforementioned and other objects, features, and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
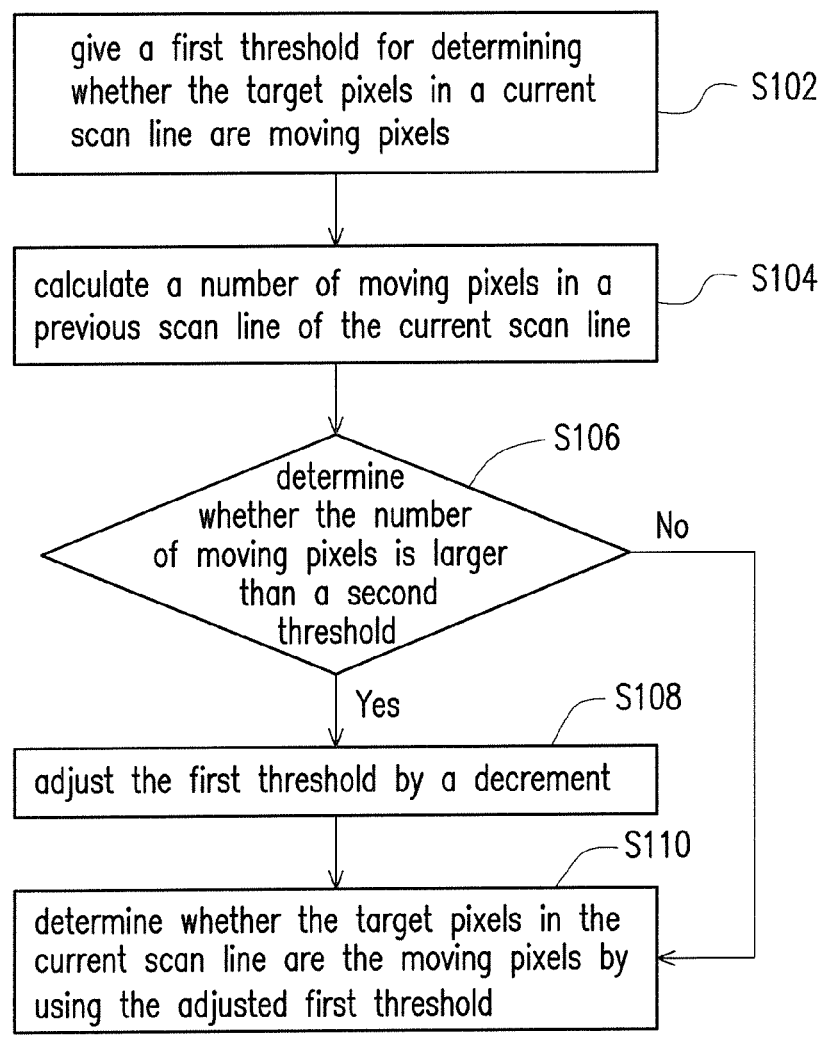
FIG. 1 is a flowchart illustrating a method of motion detection using an adaptive threshold according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In general, a moving object in a frame is usually across a plurality of scan lines. That means if moving pixels are found in a previous scan lines, pixels of a next scan line are probably moving pixels, too. Accordingly, the present invention counts the moving pixels in a previous scan line of a current scan line to determine whether the process of motion detection has entered a moving area. Once a number of the moving pixels in the previous scan line is over a preset threshold, then a magnitude of a threshold used for identifying the moving area and the static area is reduced accordingly, such that the pixels of the moving area can be detected more easily in the process of motion detection. In order to make the present invention more comprehensible, embodiments are described below as the examples to prove that the invention can actually be realized.

FIG. 1 is a flowchart illustrating a method of motion detection using an adaptive threshold according to one embodiment of the present invention. Referring to FIG. 1, the present embodiment is adaptive for determining whether a target pixel is a moving pixel or not. The steps of the method are as follows.

First, a first threshold is given for determining whether a plurality of target pixels in a current scan line are the moving pixels (S102). The first threshold is a threshold previously defined in the motion detection algorithm and used for determining whether a target pixel is a moving pixel or not. To be specific, if a sum of the differences between the corresponding neighboring pixels of the target pixel in adjacent fields is larger than the first threshold, the target pixel is determined as the moving pixel. On the other hand, if the sum of the differences between the corresponding neighboring pixels of the target pixel in adjacent fields is not larger than the first threshold, the target pixel is determined as the static pixel.

Next, a number of moving pixels in a previous scan line of the current scan line is calculated (S104). The previous scan line is a neighboring scan line above a current scan line where the target pixel is located. The moving pixels in the previous scan line can also be detected by using the first threshold.

The calculated number of moving pixels is further determined whether larger than a second threshold (S106). The number of moving pixels is used to determine whether the process of motion detection enters a moving area, so as to adaptively adjust the first threshold for determining whether the target pixels in the current scan line are the moving pixels or not.

If the number of moving pixels in the previous scan line is determined as larger than the second threshold, it reveals that the process of motion detection enters the moving area, such that the first threshold is adjusted by a decrement (S108), so as to detect the moving object.

If the number of moving pixels in the previous scan line is determined as not larger than the second threshold in the step S106 or the first threshold is adjusted in the step S108, the first threshold is further used to determine whether the target pixels in the current scan line are the moving pixels (S110). The foregoing steps S104~S110 are repeated until the motion detection of all the scan lines in the current field is completed. It should be noted herein that because the aforesaid first threshold is adjused by referencing the pixels in the previous scan line, every time the motion detection performed on the target pixels in a current scan line is completed, the result of motion detection is recorded so as to be used as the reference for calculating the number of moving pixels when performing motion detection on a next scan line.

Based on the above, the threshold for identifying the moving pixel and the static pixel is adaptively reduced if the moving object is detected in the previous scan line, such that when performing motion detection on the target pixels in the current scan line, it is easier to detect the moving pixels. However, the adjusted first threshold is also required to fit a regional principle. To be specific, once the motion detection leaves the area covered by the moving object, the reduced threshold should be restored back to the original level such that the static area cannot be mistakenly determined as the moving area. An embodiment is given below for further illustration.

Figure 2:
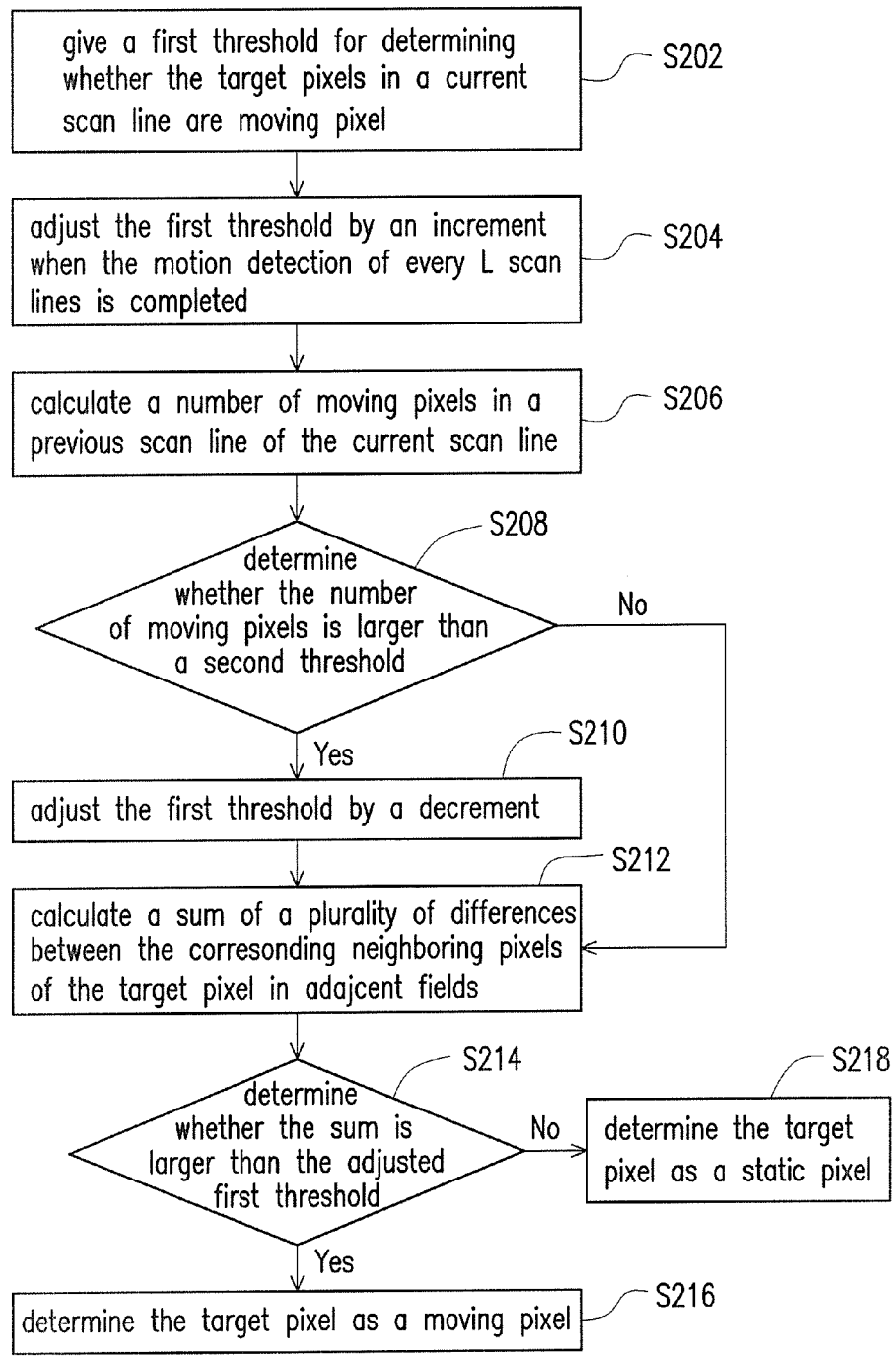
FIG. 2 is a flowchart illustrating a method of motion detection using an adaptive threshold according to one embodiment of the present invention.

FIG. 2 is a flowchart illustrating a method of motion detection using an adaptive threshold according to one embodiment of the present invention. Referring to FIG. 2, the present embodiment is adaptive for determining whether a pluralify of target pixels in a current scan line are moving pixels or not, in which the threshold for determining moving pixels and static pixels is adaptively reduced when the process of motion detection enters a moving area and the threshold is increased when the process of motion detection leaves the moving area. The steps of the method are as follows.

First, a first threshold is given for determining whether the target pixels in the current scan line are the moving pixels (S102). The first threshold is a threshold previously defined in the motion detection algorithm and used for determining whether a target pixel is a moving pixel or not.

To prevent misjudging the static area to be the moving area, every time the motion detection has been performed on L scan lines, the first threshold is adjusted by an increment (S204).

Next, a number of moving pixels in a previous scan line of the current scan line is calculated (S206), and the calculated number of moving pixels is further determined whether larger than a second threshold (S208). The number of moving pixels is used for determined whether the motion detection enters a moving area or not, so as to adaptively adjust the first threshold.

If the number of moving pixels in the previous scan line is larger than the second threshold, it reveals that the motion detection enters the moving area, such that the first threshold is adjusted by a decrement (S210). If the number of moving pixels in the previous scan line is determined as not larger than the second threshold in the step S208 or the first threshold is adjusted in the step S210, the first threshold is further used to determine whether the target pixels in the current scan line are the moving pixels.

To be specific, a sum of a plurality of differences between the corresonding neighboring pixels of the target pixel in adjacent fields is first calculated (S212). Then, the calculated sum is compared with the adjusted first threshold so as to determine whether the sum is larger than the adjusted first threshold (S214).

Finally, if the sum is determined as larger than the first threshold, then the target pixel is determined as the moving pixel (S216). On the other hand, if the sum is not determined as larger than the second threshold, then the target pixel is determined as a static pixel (S218). Through the foregoing steps S212~S218, the target pixels in the current scan line are determined as the moving pixels or the static pixels. When the motion detection of the current scan line is completed, the process is returned to step S204 for adaptively adjusting the first threshold again so as to perform the motion detection on a next scan line and the steps S204~S218 are repeated until the motion detection of all the scan lines in the current field is completed.

It should be noted herein that the first threshold as described above may have an upper limit and a lower limit. To be specific, when the adjusted first threshold is larger than the upper limit, then the first threshold is set as the upper limit. When the adjusted first threshold is smaller than the lower limit, then the first threshold is set as the lower limit. Accordingly, the magnitude of the first threshold can be manipulated in a moderate range so as to prevent from being excessively decreased or increased when the method of present embodiment is performed on extreme cases such as a huge size of the moving object that occupies the whole frame.

To sum up, the present invention provides a method of motion detection, in which a threshold used for identifying the moving area and the static area is adaptively adjusted based on the variation of pixels in a previous scan line. When the motion detection enters the moving area and leaves the movign area, the threshold is reduced and increased, respectively. Accordingly, the accuracy of motion detection can be increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of motion detection using an adaptive threshold, adaptive for determining whether a plurality of target pixels are moving pixels or not, the method comprising:
giving a first threshold for determining whether the target pixels in a current scan line are moving pixels, wherein the first threshold has an upper limit and a lower limit;
calculating a number of moving pixels in a previous scan line of the current scan line;
determining whether the number of moving pixels is larger than a second threshold;
if the number of moving pixels is larger than the second threshold, adjusting the first threshold by a decrement; and
determining whether the target pixels in the current scan line are moving pixels by using the adjusted first threshold,
wherein after the step of giving the first threshold, the method further comprises:
adjusting the first threshold by an increment when the motion detection of every L scan lines is completed, wherein L is a positive integer.

2. The method for motion detection using a content adaptive penalty function according to claim 1, wherein the first threshold is set as the upper limit when the adjusted first threshold is larger than the upper limit.

3. The method for motion detection using a content adaptive penalty function according to claim 1, wherein the first threshold is set as the lower limit when the adjusted first threshold is smaller than the lower limit.

4. The method for motion detection using a content adaptive penalty function according to claim 1, wherein after the step of determining whether the target pixels in the current scan line are moving pixels by using the adjusted first threshold, the method further comprises:
recording a result of motion detection of the target pixels in the current scan line as a reference for calculating the number of moving pixels when performing motion detection on a next scan line.

5. The method for motion detection using an adaptive threshold according to claim 1, wherein the step of determining whether the target pixels in the current scan line are moving pixels by using the adjusted first threshold comprises:
calculating a sum of a plurality of differences between the coresonding neighboring pixels of each of the target pixels in adjacent fields;
comparing the sum with the adjusted first threshold to determine whether the target pixel is the moving pixel.

6. The method for motion detection using an adaptive threshold according to claim 5, wherein the step of comparing the sum with the adjusted first threshod to determine whether the target pixel is the moving pixel comprises:
determining the target pixel as the moving pixel if the sum is larger than the first threshold; and
determining the target pixel as a static pixel if the sum is not larger than the second threshold.

\* \* \* \* \*